United States Patent
Moon et al.

(10) Patent No.: US 12,282,159 B2
(45) Date of Patent: Apr. 22, 2025

(54) RETINAL PROJECTION DISPLAY DEVICE AND PHASE PROFILE OPTIMIZATION METHOD THEREOF

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Seokil Moon, Suwon-si (KR); Minseok Chae, Seoul (KR); Changkun Lee, Suwon-si (KR); Dongheon Yoo, Seoul (KR); Byoungho Lee, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 96 days.

(21) Appl. No.: 18/117,122

(22) Filed: Mar. 3, 2023

(65) Prior Publication Data
US 2023/0400683 A1    Dec. 14, 2023

(30) Foreign Application Priority Data
Jun. 14, 2022    (KR) ........................ 10-2022-0072431

(51) Int. Cl.
*H04N 9/31*      (2006.01)
*G02B 5/32*      (2006.01)
(Continued)

(52) U.S. Cl.
CPC ........... *G02B 27/0081* (2013.01); *G02B 5/32* (2013.01); *G03B 21/2066* (2013.01);
(Continued)

(58) Field of Classification Search
CPC .................. G02B 27/0081; G02B 5/32; G02B 2027/0174; G02B 2027/0178; G02B 27/0172; G03B 21/2066; G03B 21/10; G03B 21/28; G03H 1/2645; G03H 2260/12; G03H 2001/221; G03H 2001/2242; G03H 2001/2284; G03H 2223/23; G03H 1/2205;
(Continued)

(56) References Cited

U.S. PATENT DOCUMENTS 6,402,795 B1    6/2002    Chu et al.
6,485,622 B1    11/2002    Fu
(Continued)

FOREIGN PATENT DOCUMENTS

KR    10-2018-0058372 A    6/2018
KR    10-2020-0027793 A    3/2020
(Continued)

*Primary Examiner* — Tung T Vo
(74) *Attorney, Agent, or Firm* — Sughrue Mion, PLLC (57) ABSTRACT

A retinal projection display device is provided. The retinal projection display device includes a light source configured to emit light, a spatial light modulator configured to generate diffracted light by diffracting the emitted light, a holographic optical element configured to reflect the diffracted light by duplicating the diffracted light into a plurality of complex wavefronts, and a field lens configured to focus the plurality of complex wavefronts to a plurality of respective focal points in an eye-box, wherein the plurality of complex wavefronts overlap each other.

21 Claims, 10 Drawing Sheets

(51) Int. Cl.
*G02B 27/00* (2006.01)
*G03B 21/20* (2006.01)
*G03H 1/26* (2006.01)

(52) U.S. Cl.
CPC ............ *G03H 1/2645* (2013.01); *H04N 9/312* (2013.01); *H04N 9/3155* (2013.01); *H04N 9/3173* (2013.01); *H04N 9/3179* (2013.01); *G03H 2260/12* (2013.01)

(58) Field of Classification Search
CPC ........ G03H 1/2294; G03H 1/04; H04N 9/312; H04N 9/3155; H04N 9/3173; H04N 9/3179; H04N 9/3126
USPC ........................................................... 348/40
See application file for complete search history.

(56) References Cited

U.S. PATENT DOCUMENTS

| | | | |
|---|---|---|---|
| 7,901,658 | B2 | 3/2011 | Weppner et al. |
| 8,828,580 | B2 | 9/2014 | Msco et al. |
| 10,146,053 | B2 | 12/2018 | Yuan et al. |
| 10,712,567 | B2 * | 7/2020 | Georgiou ............ G02B 27/0101 |
| 11,663,942 | B1 * | 5/2023 | Kelly ...................... G02B 26/10 |
| | | | 345/8 |
| 2013/0022222 | A1 * | 1/2013 | Zschau ................. G03H 1/2249 |
| | | | 359/9 |
| 2014/0253605 | A1 | 9/2014 | Border et al. |
| 2018/0006326 | A1 | 1/2018 | O'Neill et al. |
| 2018/0143588 | A1 | 5/2018 | Lee et al. |
| 2019/0041565 | A1 * | 2/2019 | Masson ................ G03H 1/0248 |
| 2020/0073124 | A1 | 3/2020 | Kim et al. |
| 2020/0150588 | A1 * | 5/2020 | Seo .......................... G03H 1/32 |
| 2020/0328459 | A1 | 10/2020 | Sakai et al. |
| 2021/0124171 | A1 * | 4/2021 | Kim .................... G02B 27/4205 |
| 2022/0066391 | A1 * | 3/2022 | Sung ..................... G03H 1/2202 |
| 2022/0171186 | A1 * | 6/2022 | Seo ..................... G02B 27/0172 |
| 2022/0404689 | A1 * | 12/2022 | Sluka ....................... G02B 30/29 |
| 2022/0413204 | A1 * | 12/2022 | Ukai ......................... H04N 5/64 |
| 2023/0103120 | A1 * | 3/2023 | Seo ..................... G02B 27/0172 |
| | | | 359/630 |
| 2023/0134565 | A1 * | 5/2023 | Seo ..................... G02B 27/0179 |
| | | | 359/13 |
| 2023/0194873 | A1 * | 6/2023 | Jamali ............... G02F 1/133536 |
| | | | 349/11 |
| 2023/0400811 | A1 | 12/2023 | Moon et al. |

FOREIGN PATENT DOCUMENTS

| | | |
|---|---|---|
| KR | 10-2148876 B1 | 8/2020 |
| WO | 2019/135319 A1 | 7/2019 |

* cited by examiner

RETINAL PROJECTION DISPLAY DEVICE AND PHASE PROFILE OPTIMIZATION METHOD THEREOF

CROSS-REFERENCE TO RELATED APPLICATION

This application is based on and claims priority under 35 U.S.C. § 119 to Korean Patent Application No. 10-2022-0072431, filed on Jun. 14, 2022, in the Korean Intellectual Property Office, the disclosure of which is incorporated by reference herein in its entirety.

BACKGROUND

1. Field

The disclosure relates to a retinal projection display device using a multiplexed holographic optical element and a phase profile optimization method of the retinal projection display device.

2. Description of the Related Art

Recently, research on techniques related to three-dimensional (3D) displays has been conducted. For example, research on a device capable of realizing a high quality hologram in real time by using a spatial light modulator (SLM) has been actively conducted.

A retinal projection display device is capable of providing a virtual image of a wide angle of view, regardless of a focal point adjustment reaction of a user's eye, because in the retinal projection display device, light emitted from an SLM may be focused at a position of the pupil of the user's eye by an optical system.

However, in the retinal projection display device, due to characteristics in which the light is gathered to one point, a very small focal point may be formed. Thus, in the retinal projection display device, an eye must be precisely positioned at the very small focal point to see an accurate image, and accordingly, an eye-box, which is a volume of space within which an image may be viewed, may be significantly decreased.

SUMMARY

Provided is a retinal projection display device having an expanded eye-box.

Provided is a phase optimization method of a retinal projection display device having an expanded eye-box.

Additional aspects will be set forth in part in the description which follows and, in part, will be apparent from the description, or may be learned by practice of the presented embodiments of the disclosure.

According to an aspect of the disclosure, a retinal projection display device may include a light source configured to emit light, a spatial light modulator configured to generate diffracted light by diffracting the light emitted by the light source, a holographic optical element configured to reflect the diffracted light by duplicating the diffracted light into a plurality of complex wavefronts, and a field lens configured to focus the plurality of complex wavefronts to a plurality of respective focal points in an eye-box, wherein the plurality of complex wavefronts overlap each other.

A distance between each of the plurality of focal points may be less than a diameter of a pupil of a user's eye.

The spatial light modulator may include one of a phase modulator configured to perform phase modulation, or a complex modulator configured to perform amplitude modulation and phase modulation.

The holographic optical element may include a multiplexed holographic optical element comprising a plurality of interference patterns configured duplicate the diffracted light into each of the plurality of complex wavefronts.

The holographic optical element may include a photopolymer, and the plurality of interference patterns may be provided in a form of a bulk grid.

The plurality of interference patterns of the holographic optical element may include at least three interference patterns.

The retinal projection display device may further include a relay optical system configured to transmit the diffracted light generated by the spatial light modulator to the holographic optical element.

The retinal projection display device may further include a noise removal filter configured to remove noise from the diffracted light transmitted through the relay optical system.

The retinal projection display device may further include a first light brancher provided between the light source and the spatial light modulator, and the first light brancher may be configured to reflect the light emitted from the light source toward the spatial light modulator, and transmit the diffracted light emitted from the spatial light modulator to the relay optical system.

The retinal projection display device may further include a second light brancher provided between the relay optical system and the holographic optical element, and the second light brancher may be configured to reflect the diffracted light emitted from the relay optical system toward the holographic optical element, and transmit, to the field lens, the plurality of complex wavefronts emitted from the holographic optical element.

The first light brancher and the second light brancher may include beam splitters or half mirrors.

The retinal projection display device may further include a processor configured to provide a phase profile to the spatial light modulator.

The processor may be further configured to determine a loss value between a reconstructed virtual image and a target image based on a coherent sum of the plurality of complex wavefronts, and update the phase profile based on the loss value being greater than a predetermined threshold value.

The processor may be further configured to calculate the loss value based on a loss function represented as:

$$F_{loss}=L2\mathrm{Norm}[s\times|v(x_t,y_t)|-A_{target}(x_t,y_t)]$$

where s is a scale factor, v $(x_t, y_t)$ is a signal value of an $(x_t, y_t)$ coordinate of the reconstructed virtual image, and $A_{target}(x_t, y_t)$ is a signal value of an $(x_t, y_t)$ coordinate of the target image.

The processor may be further configured to update the phase profile such that the loss value is decreased.

According to an aspect of the disclosure, a phase profile optimization method of a retinal projection display device may be provided. The retinal projection display device may include a light source configured to emit light, a spatial light modulator configured to generate diffracted light by diffracting the light emitted by the light source, a holographic optical element configured to reflect the diffracted light by duplicating the diffracted light into a plurality of complex wavefronts, and a field lens configured to focus the plurality of complex wavefronts to a plurality of respective focal points in an eye-box. The phase profile optimization method may include inputting an arbitrary phase profile to the spatial light modulator, performing a first propagation simulation on the plurality of complex wavefronts duplicated by the holographic optical element, performing a second propagation simulation until a virtual image is reconstructed, based on the plurality of complex wavefronts on which the first propagation simulation is performed, determining a loss value between the reconstructed virtual image and a target image, based on the loss value being greater than a predetermined threshold value, updating a current phase profile, and based on the loss value being less than or equal to the predetermined threshold value, ending the update.

The performing the first propagation simulation may include determining a coherent sum of the plurality of complex wavefronts.

The determining the loss value may be performed based on a loss function represented as:

$$F_{loss} = L2\text{Norm}[s \times |v(x_t, y_t)| - A_{target}(x_t, y_t)]$$

where s is a scale factor, $v(x_t, y_t)$ is a signal value of an $(x_t, y_t)$ coordinate of the virtual image, and $A_{target}(x_t, y_t)$ is a signal value of an $(x_t, y_t)$ coordinate of the target image.

The signal value of the $(x_t, y_t)$ coordinate of the virtual image may be determined based on phase profile information and a propagation function modeled based on a propagation distance between the eye-box and the virtual image.

The updating the current phase profile may be performed such that the loss value is decreased by the updated phase profile.

According to an aspect of the disclosure, a non-transitory computer-readable storage medium may store instructions that, when executed by at least one processor, cause the at least one processor to input an arbitrary phase profile to a spatial light modulator, perform a first propagation simulation on a plurality of complex wavefronts duplicated by a holographic optical element; perform a second propagation simulation until a virtual image is reconstructed, based on the plurality of complex wavefronts on which the first propagation simulation is performed, calculate a loss value between the reconstructed virtual image and a target image, based on the loss value being greater than a predetermined threshold value, update a current phase profile, and based on the loss value being less than or equal to the predetermined threshold value, end the update.

According to an aspect of the disclosure, a phase profile optimization method of a retinal projection display device may include inputting an arbitrary phase profile to a spatial light modulator, performing a first propagation simulation on a plurality of complex wavefronts duplicated by a holographic optical element, performing a second propagation simulation until a virtual image is reconstructed, based on the plurality of complex wavefronts on which the first propagation simulation is performed, calculating a loss value between the reconstructed virtual image and a target image, based on the loss value being greater than a predetermined threshold value, updating a current phase profile, and based on the loss value being less than or equal to the predetermined threshold value, ending the update.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a retinal projection display device will be described in detail by referring to the accompanying drawings. In the drawings, the same reference numerals denote the same elements and sizes of elements may be exaggerated for clarity and convenience of explanation.

Figure 1:
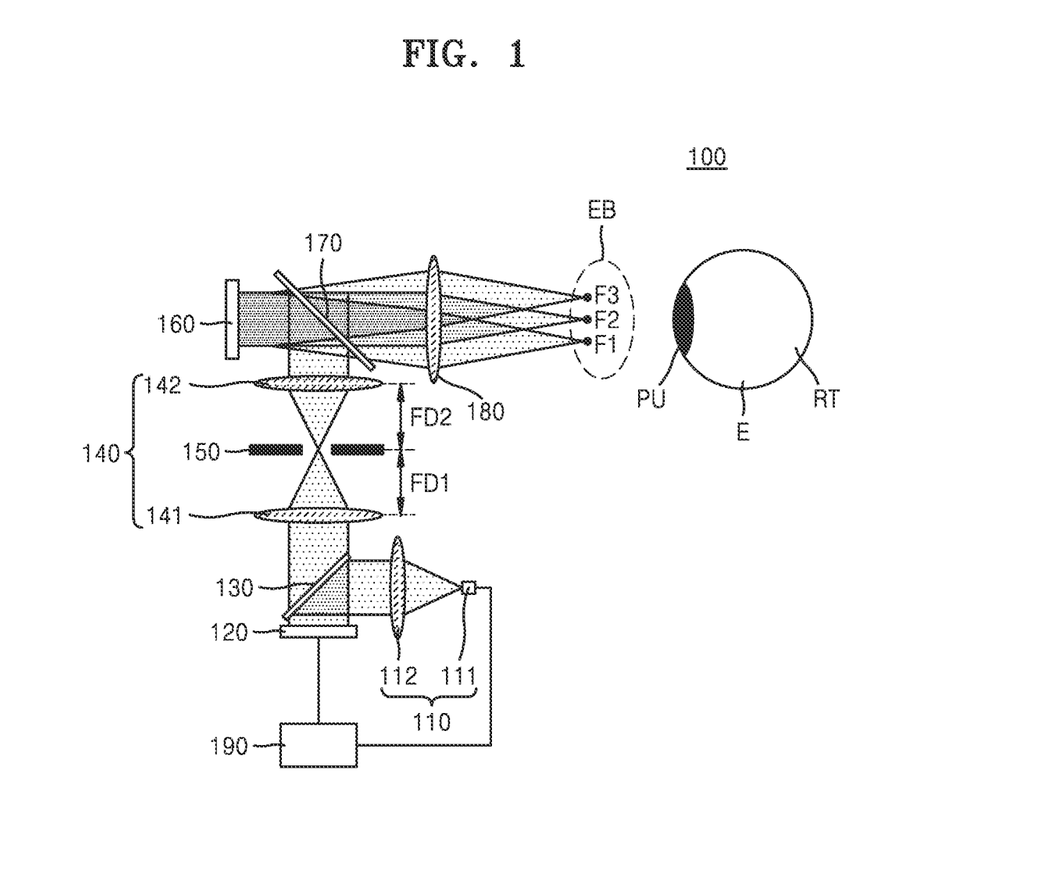
FIG. 1 is a diagram of a retinal projection display device according to an embodiment.

FIG. 1 is a diagram of a retinal projection display device according to an embodiment.

Referring to FIG. 1, the retinal projection display device 100 according to an embodiment may include a light source portion 110 providing light, a spatial light modulator 120 generating diffracted light (or a holographic wavefront) of a complex wavefront by modulating the light transmitted through the light source portion 110, a first light brancher 130 branching the light emitted from the light source portion 110, a relay optical system 140 transmitting the diffracted light of the complex wavefront transmitted through the spatial light modulator 120 to a holographic optical element 160 (or a field lens 180), a noise removal filter 150 removing noise from the diffracted light of the complex wavefront transmitted through the relay optical system 140, the holographic optical element 160 reflecting the complex wavefront transmitted through the relay optical system 140 by duplicating the complex wavefront into a plurality of complex wavefronts, a second light brancher 170 branching the complex wavefront transmitted through the relay optical system 140, the field lens 180 focusing the plurality of complex wavefronts transmitted through the holographic optical element 160 to different focal points, namely, first to third focal points F1, F2, and F3, respectively, and a processor 190 controlling the light source 111 and the spatial light modulator 120 to generate a holographic image (or the complex wavefronts). The first to third focal points F1, F2, and F3 may be formed at an eye-box corresponding to a viewing area within which an eye E of a user may move.

The light source portion 110 according to an embodiment may include a light source 111 and a collimator lens 112. The light source 111 may include a laser diode (LD) in order to provide light having high coherence to the spatial light modulator 120. However, when the light provided by the light source 111 has spatial coherence corresponding to a certain level of spatial coherence, the light may be sufficiently diffracted and modulated by the spatial light modulator 120, and thus, as the light source 111, it is also possible to use a light-emitting diode (LED). Also, the light source 111 may include red, green, and blue light source arrays and may realize a color hologram through RGB time-sharing. For example, the light source 111 may include an array of a plurality of LDs or LEDs. Also, in addition to the LDs or the LEDs, the light source 111 may include any type of light source emitting light having spatial coherence.

The light source portion 110 may illuminate collimated parallel light. For example, the light source portion 110 may collimate the light emitted from the light source 111 to parallel light by using the collimator lens 112.

The spatial light modulator 120 may form a hologram pattern on a light modulation surface according to a hologram data signal provided by the processor 190. The hologram data signal may include an arbitrary phase profile. Light incident to the spatial light modulator 120 may be modulated through a complex wavefront by a hologram pattern to become diffracted light. The diffracted light having an image of the complex wavefront may progress through the relay optical system 140, the holographic optical element 160, and the field lens 180 as described below, and thus, a user may view a holographic image in the eye-box EB through diffraction interference.

As the spatial light modulator 120, any one of a phase modulator capable of performing only phase modulation and a complex modulator capable of performing both phase modulation and amplitude modulation may be used. FIG. 1 illustrates that the spatial light modulator 120 is a reflective spatial light modulator, according to an embodiment. However, it is also possible to use a transmissive spatial light modulator. As the reflective spatial light modulator, a digital micro-mirror device (DMD), a liquid crystal on silicon (LCoS), or a semiconductor modulator may be used, for example. As the transmissive spatial light modulator, a semiconductor modulator based on a compound semiconductor such as GaAs, or a liquid crystal device (LCD) may be used, for example.

The first light brancher 130 may be arranged between the light source portion 110 and the spatial light modulator 120. Incident light and emitted light denote the light that is incident and the light that is emitted to and from the spatial light modulator 120, respectively. The first light brancher 130 may include a beam splitter configured to reflect light emitted from the light source 111 and make the light progress toward the spatial light modulator 120 and to transmit diffracted light reflected from the spatial light modulator 120 to the relay optical system 140. As another example, the first light brancher 130 may include a half mirror.

The light illuminated from the light source portion 110 may have polarization. The light source 111 may directly emit polarized light, or a polarization filter may be arranged in the light source portion 110 and may polarize the light emitted from the light source 111. In this case, the first light brancher 130 may correspond to a polarization beam splitter. A polarization conversion member, such as a ¼ wave plate, may further be arranged between the first light brancher 130 and the spatial light modulator 120 and may make polarization of the light progressing from the first light brancher 130 toward the spatial light modulator 120 and polarization of the light reflected from the spatial light modulator 120 and progressing toward the first light brancher 130 to be different from each other, thereby relatively more efficiently branching the incident light and the emitted light.

The relay optical system 140 may correspond to a modified 4f optical system configured to transmit the diffracted light of the complex wavefront generated by the spatial light modulator 120 to the holographic optical element 160 (or the field lens 180).

The relay optical system 140 according to an embodiment may include a first relay lens 141 having a first focal length FD1 and a second relay lens 142 having a second focal length FD2. Based on this optical arrangement of the relay optical system 140, the image of the complex wavefront generated on a surface of the spatial light modulator 120 may be imaged at or around the second focal length FD2 at the side of an emission surface of the second relay lens 142 through the relay optical system 140.

The first focal length FD1 and the second focal length FD2 may have the same value as each other. The relay optical system 140 may make the first focal length FD1 and the second focal length FD2 to be the same as each other, to uniformly maintain the size of the image of the complex wavefront. However, the first focal length FD1 and the second focal length FD2 may have different values from each other. The relay optical system 140 may make the second focal length FD2 to be greater than the first focal length FD1, to increase the size of the image of the complex wavefront. Alternatively, the relay optical system 140 may make the first focal length FD1 to be greater than the second focal length FD2, to decrease the size of the image of the complex wavefront.

The noise removal filter 150 may be arranged at or around a location at which the first focal length FD1 at the side of an emission surface of the first relay lens 141 of the relay optical system 140 overlaps the second focal length FD2 at the side of an incident surface of the second relay lens 142 of the relay optical system 140. This noise removal filter 150 may include, for example, a pin-hole. The noise removal filter 150 may be positioned at the first focal length FD1 of the first relay lens 141 of the relay optical system 140 and may block light except for light of a desired diffraction order, to remove noise, such as a diffraction pattern or multiplexed diffraction due to a pixel structure of the spatial light modulator 120.

The holographic optical element 160 may correspond to a multiplexed holographic optical element including a plurality of interference patterns configured to reflect, in different directions, diffracted light of a single complex wavefront transmitted through the relay optical system 140 by duplicating the diffracted light of the single complex wavefront into diffracted light of a plurality of complex wavefronts.

For example, the holographic optical element 160 may include a first interference pattern configured to form a first complex wavefront focused to the first focal point F1, a second interference pattern configured to form a second complex wavefront focused to the second focal point F2, and a third interference pattern configured to form a third complex wavefront focused to the third focal point F3. For convenience of explanation, according to the embodiment illustrated in FIG. 1, the holographic optical element 160 is described as including three interference patterns. However, the number of interference patterns may be freely modified to correspond to a size of the eye-box EB without departing from the scope of the disclosure.

The second light brancher 170 may be arranged between the relay optical system 140 and the holographic optical element 160. Incident light and emitted light denote the light that is incident and the light that is emitted to and from the holographic optical element 160, respectively The second light brancher 170 may include a beam splitter configured to reflect the diffracted light of the complex wavefront incident through the relay optical system 140 and make the diffracted light progress toward the holographic optical element 160 and to transmit the light (or the complex wavefronts) reflected from the holographic optical element 160 to the field lens 180. As another example, the second light brancher 170 may include a half mirror.

As described above, the diffracted light of the single complex wavefront formed on a light modulation surface of the spatial light modulator 120 may be duplicated into the diffracted light of the plurality of complex wavefronts by the holographic optical element 160. The field lens 180 may focus the plurality of duplicated complex wavefronts to different focal points, namely, the first to third focal points F1, F2, and F3, respectively, to form the eye-box EB in front of the pupil of the user's eye E.

A distance between the first to third focal points F1, F2, and F3 of the retinal projection display device 100 according to an embodiment may be less than a diameter of the pupil PU of the user's eye E. For example, when the diameter of the pupil PU of the user's eye E is about 4 mm, the distance between the first to third focal points F1, F2, and F3 may be about 2 mm.

The processor 190 may generate a hologram data signal and provide the hologram data signal to the spatial light modulator 120. The hologram data signal may be a computer-generated hologram (CGH) signal calculated to reproduce a target hologram on a spatial dimension.

The color hologram may be realized by RGB time-sharing. For example, the processor 190 may sequentially drive red, green, and blue light sources of the light source portion 110 and transmit hologram data signals corresponding to red, green, and blue holograms to the spatial light modulator 120, and thus, the red, green, and blue holograms may be time-sequentially displayed as the color hologram.

The retinal projection display device 100 described above may include a wearable device. For example, the retinal projection display device 100 may include augmented reality (AR) glasses.

Hereinafter, a method of forming the first interference pattern, the second interference pattern, and the third interference pattern is described with reference to FIGS. 2 and 3.

Figure 2:
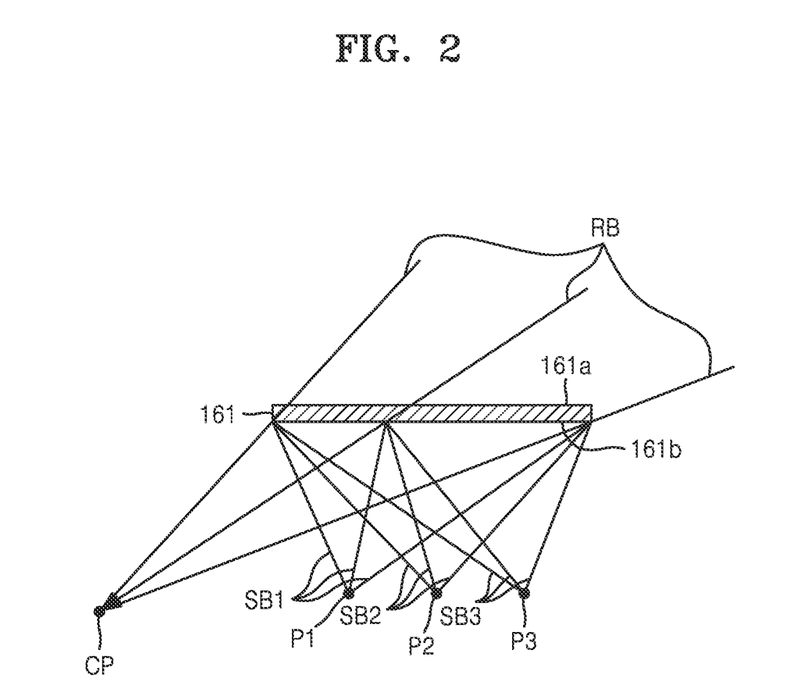
FIG. 2 is a diagram of a method of manufacturing a holographic optical element, according to an embodiment.

FIG. 2 is a diagram of a method of manufacturing a holographic optical element 160, according to an embodiment. FIG. 3 is a diagram of a scene in which an image is reproduced by a holographic optical element 160, according to an embodiment. FIG. 4 is a diagram of complex wavefronts overlapping each other in a position of an eye-box EB of FIG. 1 according to an embodiment.

Referring to FIGS. 1 and 2, when two coherent rays of light meet each other, an interference pattern may be formed on a spatial dimension. When a material reacting with rays of light, such as a photopolymer, is positioned at this point, a monomer molecule in a device may change to a polymer molecule according to a brightness of the interference pattern, and thus, the interference pattern may be written in the form of a bulk grid. When the generated bulk grid undergoes ultraviolet-ray curing, the generated bulk grid may not further react with light and may be fixed. The bulk grid may be written when there is a monomer molecule in the holographic optical element 160, and thus, a number of bulk grids may be simultaneously written in one photopolymer.

In detail, the first interference pattern included in the holographic optical element 160 may be formed based on interference between a reference beam RB incident to a first surface 161a of a photosensitive film 161 and a first signal beam SB1 incident to a second surface 161b facing the first surface 161a. Also, the second interference pattern may be formed based on interference between the reference beam RB incident to the first surface 161a of the photosensitive film 161 and a second signal beam SB2 incident to the second surface 161b facing the first surface 161a. Likewise, the third interference pattern may be formed based on interference between the reference beam RB incident to the first surface 161a of the photosensitive film 161 and a third signal beam SB3 incident to the second surface 161b facing the first surface 161a. In this case, the reference beam RB may be incident to the first surface 161a such that an extension line of a progression path is focused to a convergence point CP. Also, the first signal beam SB1 may be emitted from a first point P1 and incident to the second surface 161b, the second signal beam SB2 may be emitted from a second point P2 different from the first point P1 and incident to the second surface 161b, and the third signal beam SB3 may be emitted from a third point P3 different from the first point P1 and the second point P2 and incident to the second surface 161b.

When one of the rays of light used for initial writing is incident to the holographic optical element 160 generated as described above, the rest of the rays may be restored by the written bulk grid and emitted. This process is referred to as multiplexing. By undergoing the multiplexing process, a plurality of duplicated rays of light may be generated from one incident ray of light.

Figure 3:
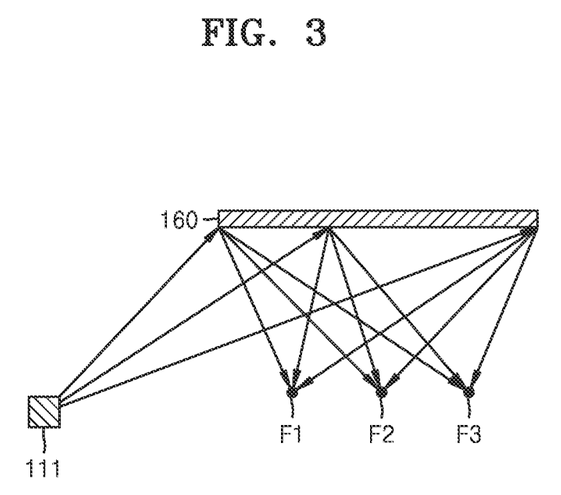
FIG. 3 is a diagram of a scene in which an image is reproduced by a holographic optical element, according to an embodiment.
Figure 4:
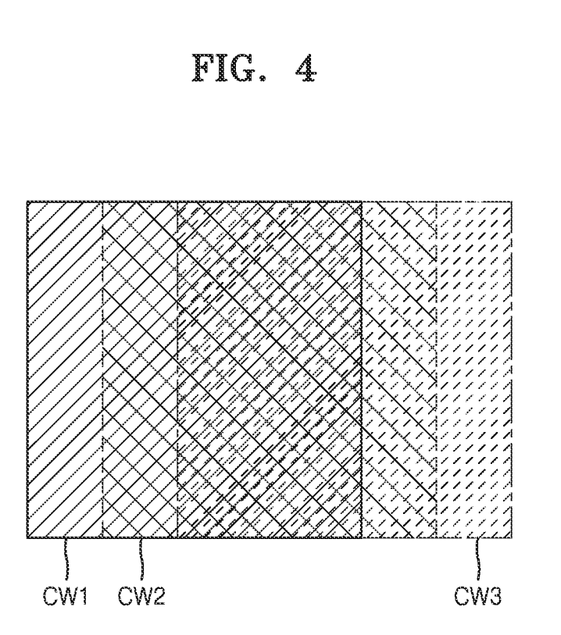
FIG. 4 is a diagram of complex wavefronts overlapping each other in a position of an eye-box of FIG. 1 according to an embodiment.

Referring to FIGS. 1 and 3, when the light emitted from the light source 111 and modulated by the spatial light modulator 120 is incident to the holographic optical element 160 through the relay optical system 140, the light may be focused to each of the first focal point F1, the second focal point F2, and the third focal point F3. The first to third focal points F1 to F3 may be the same points as the first to third points P1 to P3 illustrated in FIG. 2, respectively.

Referring to FIGS. 1 and 4, as described above, the distance between the first to third focal points F1 to F3 formed in the retinal projection display device 100 according to the disclosure may be less than a diameter of the pupil of the user's eye E. Thus, two or more rays of light from among the rays of light focused to the first to third focal points F1 to F3 may be simultaneously transmitted through the pupil PU of the user's eye E, and thus, images formed in the retina may overlap each other.

That is, a first complex wavefront CW1, a second complex wavefront CW2, and a third complex wavefront CW3 may be continually arranged to overlap each other. The first complex wavefront CW1 may be an image formed when the light focused to the first focal point F1 positioned in the eye-box EB reaches the retina RT through the pupil PU of the user's eye E, the second complex wavefront CW2 may be an image formed when the light focused to the second focal point F2 positioned in the eye-box EB reaches the retina RT through the pupil PU of the user's eye E, and the third complex wavefront CW3 may be an image formed when the light focused to the third focal point F3 positioned in the eye-box EB reaches the retina RT through the pupil PU of the user's eye E. Hereinafter, for convenience of explanation, it may be illustrated and described that the first complex wavefront CW1, the second complex wavefront CW2, and the third complex wavefront CW3 are continually arranged to overlap each other in the eye-box EB rather than the retina RT.

As described above, in the retinal projection display device 100 according to an embodiment, the first to third complex wavefronts CW1 to CW3 may be continually arranged to overlap each other, and thus, the effect of an increased eye-box may be expected, compared with a case in which a single complex wavefront is arranged. However, due to an optical path difference occurring in a process in which the light is emitted from the light source 111 and focused to the plurality of focal points F1 to F3, a virtual image reconstructed by the first complex wavefront CW1, a virtual image reconstructed by the second complex wavefront CW2, and a virtual image reconstructed by the third complex wavefront CW3 may be different from each other. When different virtual images are displayed in an overlapping manner, the display quality of the retinal projection display device 100 may deteriorate. Therefore, with respect to the retinal projection display device 100 according to the disclosure, a phase profile of the spatial light modulator 120 may have to be optimized, in order to view a desired target image when the user's eye E is positioned in the increased eye-box EB.

Figure 5:
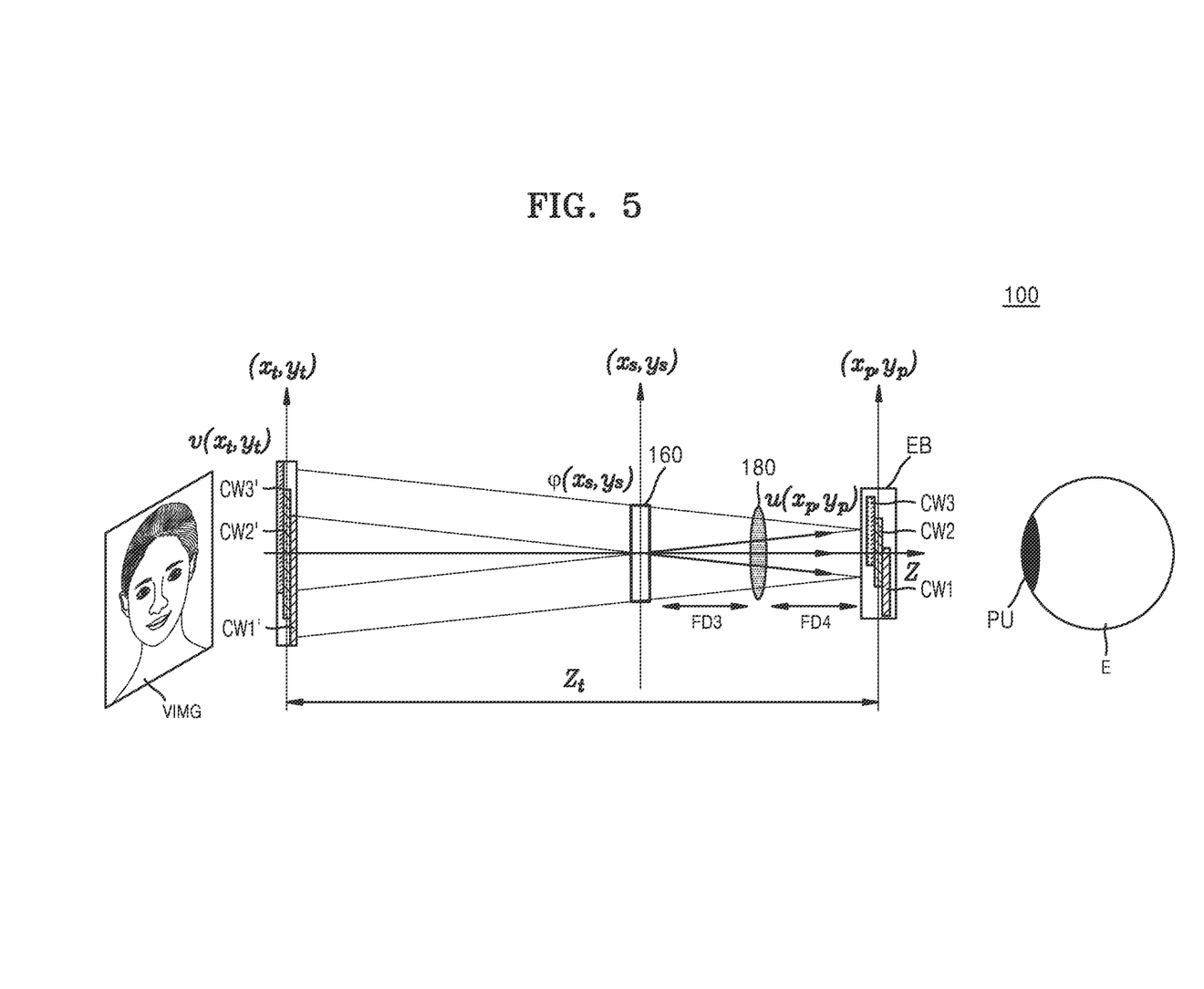
FIG. 5 is a diagram of a method of optimizing a phase profile using the retinal projection display device of FIG. 1, according to an embodiment.
Figure 6:
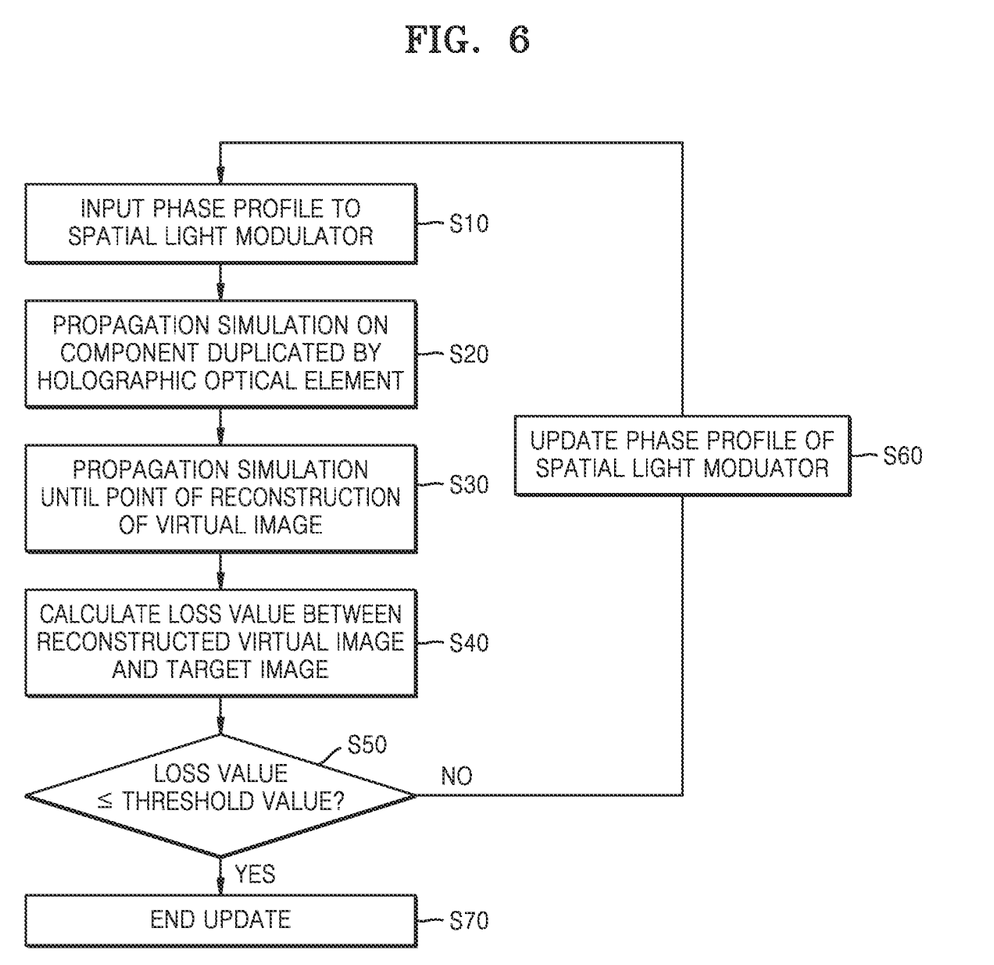
FIG. 6 is a flowchart of a method of optimizing a phase profile according to an embodiment.

FIG. 5 is a diagram of a method of optimizing a phase profile using the retinal projection display device 100 of FIG. 1, according to an embodiment. FIG. 6 is a flowchart of the method of optimizing the phase profile according to an embodiment.

Referring to FIG. 5, the retinal projection display device 100 according to an embodiment may display a virtual image VIMG at a position which is, based on an eye-box EB in which the pupil PU of the user's eye E is positioned, apart by a propagation distance $z_t$ in a z-axis direction. For example, the propagation distance $z_t$ may be 1 m.

The virtual image VIMG may include a first virtual image CW1', a second virtual image CW2', and a third virtual image CW3' corresponding to the first complex wavefront CW1, the second complex wavefront CW2, and the third complex wavefront CW3, respectively. The first virtual image CW1', the second virtual image CW2', and the third virtual image CW3' may be continually arranged to overlap each other. In this case, the first virtual image CW1', the second virtual image CW2', and the third virtual image CW3' may be represented by $(x_t, y_t)$ coordinates. $v(x_t, y_t)$ is a signal value of an $(x_t, y_t)$ coordinate of a virtual image.

The holographic optical element 160 may be a multiplexed holographic optical element and may emit a single complex wavefront transmitted through the relay optical system (see 140 of FIG. 1) in different directions by duplicating the single complex wavefront into a plurality of complex wavefronts, that is, the first to third complex wavefronts CW1, CW2, and CW3. The complex wavefront imaged on the holographic optical element 160 may include phase profile information $\varphi(x_s, y_s)$ of the CGH input to the spatial light modulator 120. Also, the complex wavefront imaged on the holographic optical element 160 may be represented by an $(x_s, y_s)$ coordinate.

The first complex wavefront CW1, the second complex wavefront CW2, and the third complex wavefront CW3 may be continually arranged in the eye-box EB to overlap each other. Here, each of the first to third complex wavefronts CW1 to CW3 may be represented by an $(x_p, y_p)$ coordinate. $u(x_p, y_p)$ is a signal value of an $(x_p, y_p)$ coordinate of a duplicated complex wavefront.

The field lens 180 may be arranged between the holographic optical element 160 and the eye-box EB. A focal length FD3 at the side of an incident surface of the field lens 180 and a focal length D4 at the side of an emission surface of the field lens 180 may be the same as each other. For example, the focal length FD3 at the side of the incident surface of the field lens 180 and the focal length FD4 at the side of the emission surface of the field lens 180 may be 30 mm.

Referring to FIGS. 1, 5, and 6, the method of optimizing the phase profile may include operation S10 of inputting a phase profile to the spatial light modulator 120, operation S20 of performing a first propagation simulation on a component duplicated by the holographic optical element 160, operation S30 of performing a second propagation simulation until a point of reconstruction of the virtual image VIMG, operation S40 of calculating a loss value between the reconstructed virtual image VIMG and a target image, operation S50 of determining whether the loss value is less than or equal to a predetermined threshold value, operation S60 of updating the phase profile of the spatial light modulator 120 when the loss value exceeds the predetermined threshold value, and operation S70 of ending the optimization of the phase profile of the spatial light modulator 120 when the loss value is less than or equal to the predetermined threshold value.

In detail, in operation S10 of inputting of the phase profile to the spatial light modulator 120, the processor 190 may provide a hologram data signal to the spatial light modulator 120. The hologram data signal may be a CGH signal calculated to reproduce the target image on a spatial dimension. The CGH signal may include an arbitrary phase profile.

In operation S20 of performing of the first propagation simulation on the component (that is, the plurality of complex wavefronts) duplicated by the holographic optical element 160, the processor 190 may calculate a coherent sum of the plurality of complex wavefronts CW1, CW2, and CW3 duplicated by the holographic optical element 160.

In operation S30 of performing of the second propagation simulation until the point of reconstruction of the virtual image VIMG, the processor 190 may perform the propagation simulation until the point of reconstruction of the virtual image VIMG, based on the calculated coherent sum of the complex wavefronts CW1, CW2, and CW3. The propagation simulation may be performed by using the phase profile information $\varphi(x_s, y_s)$ of the CGH and a propagation function $F(\varphi(x_s, y_s), z_t)$ modeled by a function with respect to the propagation distance $z_t$ between the eye-box EB and the virtual image VIMG. That is, the signal value $v(x_t, y_t)$ of the $(x_t, y_t)$ coordinate of the virtual image may be calculated by the propagation function $F(\varphi(x_s, y_s), z_t)$.

In operation S40 of calculating of the loss value between the reconstructed virtual image VIMG and the target image, the processor 190 may calculate the loss value between the reconstructed virtual image VI MG and the target image by using a loss function Floss represented by Equation (1):

$$F_{loss} = L2\text{Norm}[s \times |v(x_t, y_t)| - A_{target}(x_t, y_t)] \quad (1)$$

where s is a scale factor, $v(x_t, y_t)$ is a signal value of the $(x_t, y_t)$ coordinate of the virtual image, and $A_{target}(x_t, y_t)$ is a signal value of an $(x_t, y_t)$ coordinate of the target image. Equation (1) is normalized by using L2Norm. However, it is possible to regularize Equation (1) by using L1Norm.

In operation S50 of determining of whether the loss value is less than or equal to the predetermined threshold value, the processor 190 may determine whether the loss value calculated by Equation (1) above is less than or equal to the predetermined threshold value. The predetermined threshold value, which is a value at which it may be recognized through the user's eye E that the virtual image and the target image have substantially the same display quality, may be determined based experiments or the statistics.

In operation S60 of updating of the phase profile of the spatial light modulator 120 when the loss value exceeds the predetermined threshold value, when the loss value exceeds the predetermined threshold value, the processor 190 may update the phase profile information φ ($x_s$, $y_s$) such that the loss function Floss reflecting an error between the signal value v ($x_t$, $y_t$) of the ($x_t$, $y_t$) coordinate of the virtual image and the signal value $A_{target}$ ($x_t$, $y_t$) of the ($x_t$, $y_t$) coordinate of the target image is decreased. The processor 190 according to an embodiment may update the phase profile information φ ($x_s$, $y_s$) by using Equation (2):

$$\varphi(x_s, y_s)_{i+1} \leftarrow \varphi(x_s, y_s)_i - \alpha \frac{\partial(F_{loss}(v(x_t, y_t), A_{target}(x_t, y_t)))}{\partial(\varphi(x_s, y_s)_i)} \quad (2)$$

where, α is a proportional constant, φ ($x_s$, $y_s$) i is the current phase profile information, φ ($x_s$, $y_s$) i+1 is updated phase profile information, v ($x_t$, $y_t$) is the signal value of the ($x_t$, $y_t$) coordinate of the virtual image, $A_{target}$ ($x_t$, $y_t$) is the signal value of the ($x_t$, $y_t$) coordinate of the target image, and Floss is the loss function.

v ($x_t$, $y_t$) may be calculated through a propagation function F (φ ($x_s$, $y_s$) i, $z_t$). Thus, Equation (2) above may be represented by Equation (3) below.

$$\varphi(x_s, y_s)_{i+1} \leftarrow \varphi(x_s, y_s)_i - \alpha \frac{\partial(F_{loss}(F(\varphi(x_s, y_s)_i, z_s), A_{target}(x_t, y_t)))}{\partial(\varphi(x_s, y_s)_i)} \quad (3)$$

In operation S70 of ending of the optimization of the phase profile of the spatial light modulator 120 when the loss value is less than or equal to the predetermined threshold value, when the loss value is less than or equal to the predetermined threshold value, the processor 190 may not update the phase profile and may determine the current phase profile information to be a final phase profile.

Figure 7:
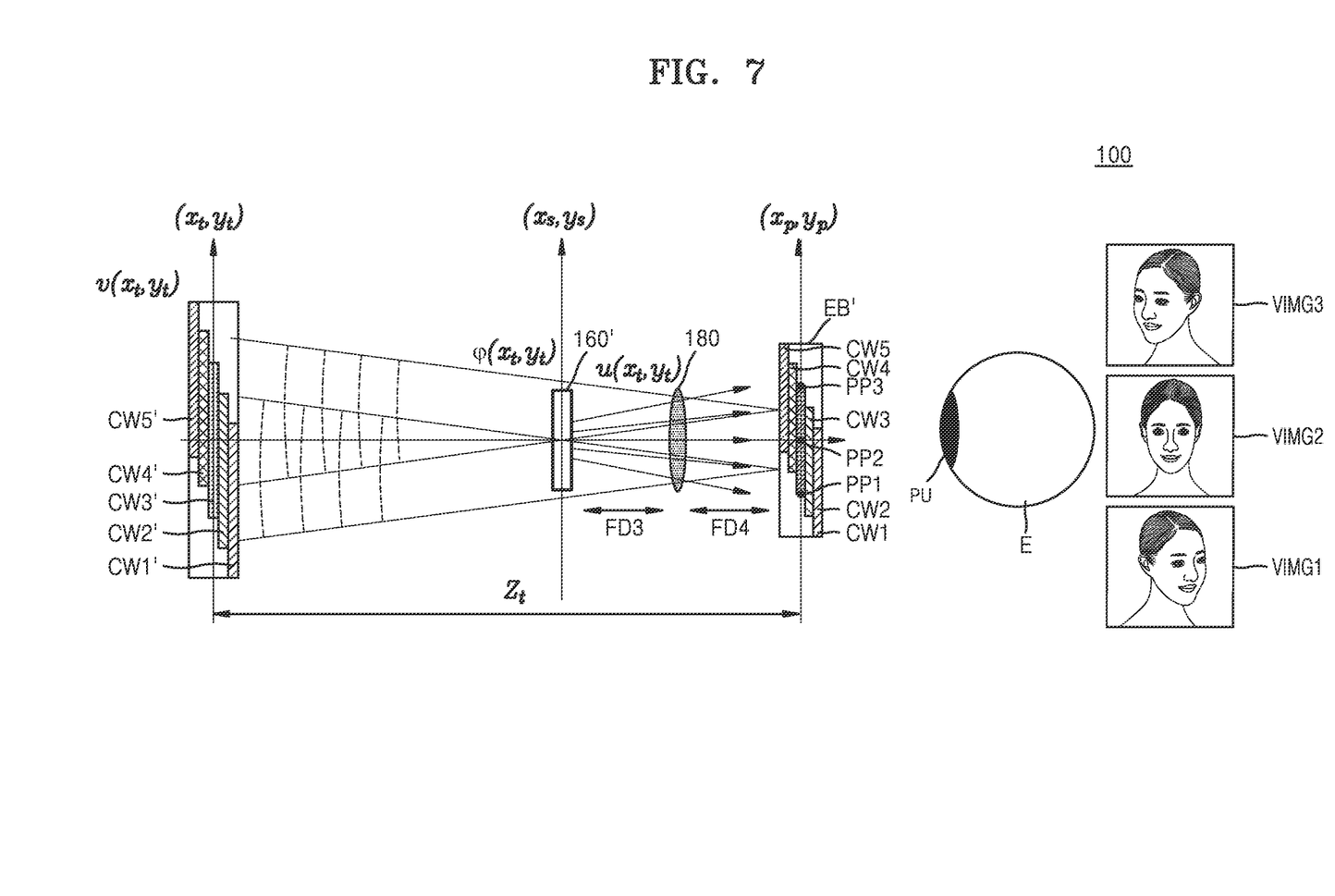
FIG. 7 is a diagram of an effect of a retinal projection display device having an eye-box expanded by using a multiplexed holographic optical element, according to an embodiment.
Figure 8:
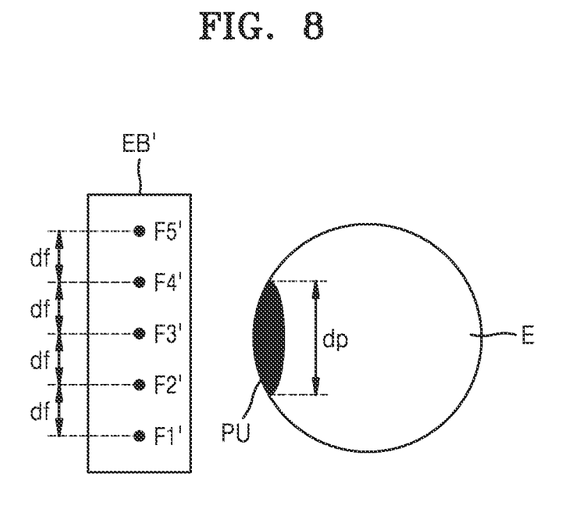
FIG. 8 is a diagram of a plurality of focal points focused at the eye-box of FIG. 7 according to an embodiment.
Figure 9:
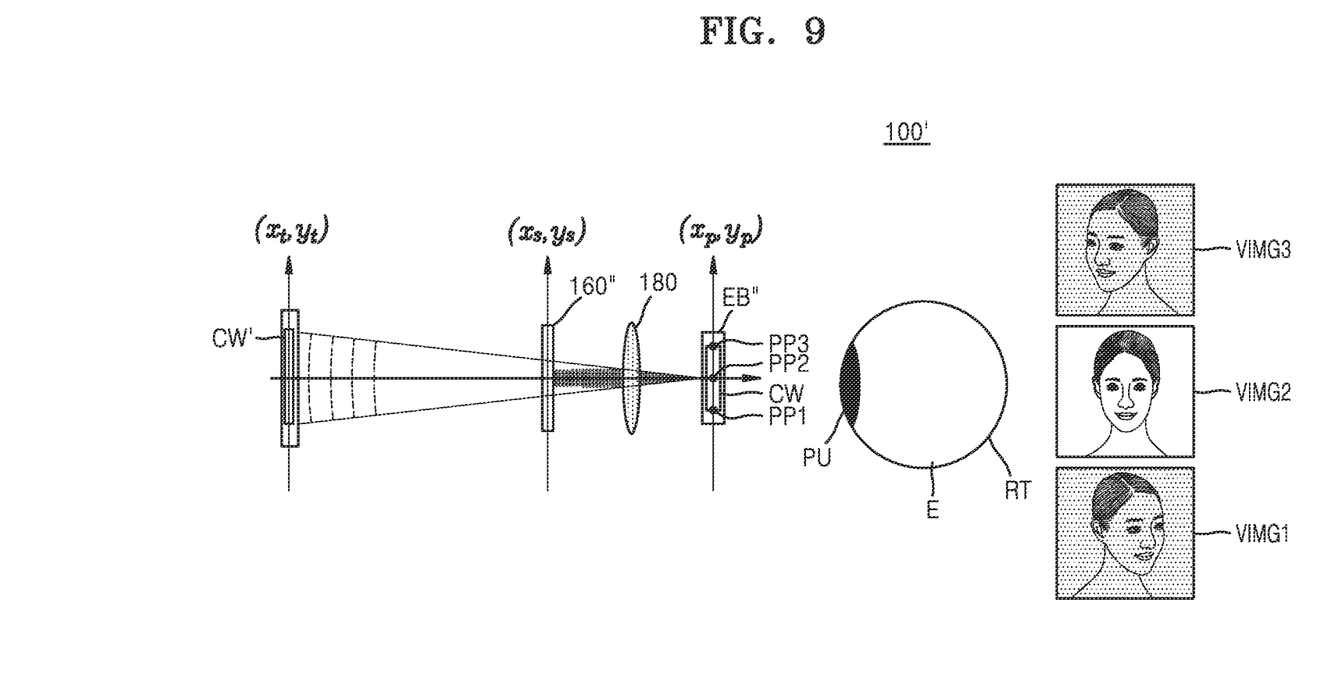
FIG. 9 is a diagram of an eye-box formed by a holographic optical element including a single interference pattern according to an embodiment.
Figure 10:
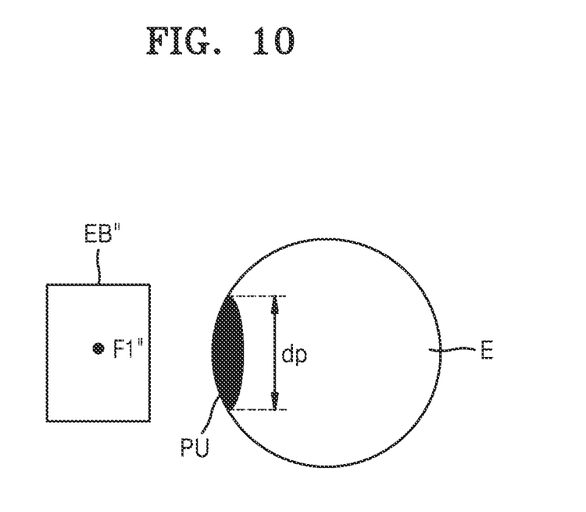
FIG. 10 is a diagram of a single focal point focused at the eye-box illustrated in FIG. 9, according to an embodiment.

FIG. 7 is a diagram of an effect of a retinal projection display device having an eye-box expanded by using a multiplexed holographic optical element, according to an embodiment. FIG. 8 is a diagram of a plurality of focal points focused at the eye-box of FIG. 7 according to an embodiment. FIG. 9 is a diagram of an eye-box formed by a holographic optical element including a single interference pattern according to an embodiment. FIG. 10 is a diagram of a single focal point focused at the eye-box illustrated in FIG. 9, according to an embodiment. Hereinafter, descriptions that are the same as the descriptions with respect to the components of FIGS. 1 through 6 may be omitted.

An embodiment illustrated in FIGS. 7 and 8 assumes that the method of optimizing the phase profile described above with reference to FIGS. 5 and 6 is already performed.

Referring to FIGS. 7 and 8, a holographic optical element 160' according to an embodiment may be a multiplexed holographic optical element including a plurality of interference patterns and may emit diffracted light of a single complex wavefront that is incident in different directions by duplicating the diffracted light of the single complex wavefront into diffracted light of a plurality of complex wavefronts. For example, the holographic optical element 160' may emit the incident diffracted light of the single complex wavefront in different directions by duplicating the incident diffracted light of the single complex wavefront into diffracted light of five complex wavefronts.

The duplicated complex wavefronts may be focused to a plurality of focal points, that is, first to fifth focal points F1', F2', F3', F4', and F5', respectively, by the field lens 180. A first complex wavefront (or a first virtual image) CW1' corresponding to the first focal point F1', a second complex wavefront (or a second virtual image) CW2' corresponding to the second focal point F2', a third complex wavefront (or a third virtual image) CW3' corresponding to the third focal point F3', a fourth complex wavefront (or a fourth virtual image) CW4' corresponding to the fourth focal point F4', and a fifth complex wavefront (or a fifth virtual image) CW5' corresponding to the fifth focal point F5' may be continually arranged to overlap each other. Accordingly, a size of an eye-box EB' may be increased.

For example, a distance df between the adjacent focal points F1', F2', F3', F4', and F5' may be 2 mm, and a diameter dp of the pupil PU of a user's eye E may be 4 mm. In this case, the retinal projection display device 100 may form the eye-box EB' having a size of at least 8 mm. Because the size of the eye-box EB' is relatively greater than the diameter dp of the pupil PU, a desired image may be viewed even when the user's eye E is moved within the increased eye-box EB'. When the user's eye E is positioned at a first point PP1, a first virtual image VIMG1 on which a right surface of an object is displayed may be viewed, when the user's eye E is positioned at a second point PP2, a second virtual image VIMG2 on which a front surface of the object is displayed may be viewed, and when the user's eye E is positioned at a third point PP3, a third virtual image VIMG3 on which a left surface of the object is displayed may be viewed.

However, referring to FIGS. 9 and 10, a holographic optical element 160" according to an embodiment may include only a single interference pattern, and accordingly, may emit an incident single complex wavefront in one direction. The single complex wavefront emitted from the holographic optical element 160" may be focused to one focal point F1" by the field lens 180. The first complex wavefront CW may be arranged at a position corresponding to the focal point F1".

As described above, a retinal projection display device 100' illustrated in FIGS. 9 and 10 may form an eye-box EB" including only the first complex wavefront CW. For example, a size of the eye-box EB" may be about 5 mm. Because the size of the eye-box EB" is almost the same as the diameter dp of the pupil PU, it may be difficult to view a desired image just when the user's eye E is slightly moved from a predetermined position in the eye-box EB". When the user's eye E is positioned at the second point PP2 corresponding to the center of the eye-box EB", the second virtual image VIMG2 may be normally viewed, but when the user's eye E is positioned at the first point PP1 or the third point PP3 corresponding to an edge of the eye-box EB", the first virtual image VIMG1 or the third virtual image VIMG3 may not be normally viewed.

The retinal projection display device according to embodiments may expand an eye-box by continually forming a plurality of complex wavefronts in the eye-box by using a multiplexed holographic optical element.

The retinal projection display device according to embodiments may minimize a loss value between a virtual image and a target image by updating a phase profile.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A retinal projection display device comprising:
   a light source configured to emit light;
   a spatial light modulator configured to generate diffracted light by diffracting the light emitted by the light source;
   a holographic optical element configured to reflect the diffracted light by duplicating the diffracted light into a plurality of complex wavefronts;
   a field lens configured to focus the plurality of complex wavefronts to a plurality of focal points in an eye-box; and
   a processor configured to:
      determine a loss value between a reconstructed virtual image and a target image, and
      based on the loss value, update a phase profile,
   wherein the plurality of complex wavefronts are continually arranged to overlap each other.

2. The retinal projection display device of claim 1, wherein a distance between each of the plurality of focal points is less than a diameter of a pupil of an eye of a user.

3. The retinal projection display device of claim 1, wherein the spatial light modulator comprises one of:
   a phase modulator configured to perform phase modulation; or
   a complex modulator configured to perform amplitude modulation and phase modulation.

4. The retinal projection display device of claim 1, wherein the holographic optical element comprises a multiplexed holographic optical element comprising a plurality of interference patterns configured to duplicate the diffracted light into each of the plurality of complex wavefronts.

5. The retinal projection display device of claim 4, wherein the holographic optical element comprises a photopolymer, and
   wherein the plurality of interference patterns are provided in a form of a bulk grid.

6. The retinal projection display device of claim 4, wherein the plurality of interference patterns of the holographic optical element comprise at least three interference patterns.

7. The retinal projection display device of claim 1, further comprising a relay optical system configured to transmit the diffracted light generated by the spatial light modulator to the holographic optical element.

8. The retinal projection display device of claim 7, further comprising a noise removal filter configured to remove noise from the diffracted light transmitted through the relay optical system.

9. The retinal projection display device of claim 7, further comprising a first light brancher provided between the light source and the spatial light modulator,
   wherein the first light brancher is configured to:
      reflect the light emitted from the light source toward the spatial light modulator; and
      transmit the diffracted light emitted from the spatial light modulator to the relay optical system.

10. The retinal projection display device of claim 9, further comprising a second light brancher provided between the relay optical system and the holographic optical element,
    wherein the second light brancher is configured to:
       reflect the diffracted light emitted from the relay optical system toward the holographic optical element; and
       transmit, to the field lens, the plurality of complex wavefronts emitted from the holographic optical element.

11. The retinal projection display device of claim 10, wherein the first light brancher and the second light brancher comprise beam splitters or half mirrors.

12. The retinal projection display device of claim 1, wherein the processor is further configured to provide the phase profile to the spatial light modulator.

13. The retinal projection display device of claim 12, wherein
    the loss value is greater than a predetermined threshold value.

14. The retinal projection display device of claim 1, wherein the processor is further configured to determine the loss value based on a loss function represented as:

$$F_{loss} = L2\text{Norm}[s \times |v(x_t, y_t)| - A_{target}(x_t, y_t)]$$

where s is a scale factor, v $(x_t, y_t)$ is a signal value of an $(x_t, y_t)$ coordinate of the reconstructed virtual image, and $A_{target}$ $(x_t, y_t)$ is a signal value of an $(x_t, y_t)$ coordinate of the target image.

15. The retinal projection display device of claim 1, wherein the processor is further configured to update the phase profile such that the loss value is decreased.

16. A phase profile optimization method of a retinal projection display device, wherein the retinal projection display device comprises:
    a light source configured to emit light;
    a spatial light modulator configured to generate diffracted light by diffracting the light emitted by the light source;
    a holographic optical element configured to reflect the diffracted light by duplicating the diffracted light into a plurality of complex wavefronts; and
    a field lens configured to focus the plurality of complex wavefronts to a plurality of respective focal points in an eye-box,
    the phase profile optimization method comprising:
       inputting an arbitrary phase profile to the spatial light modulator;
       performing a first propagation simulation on the plurality of complex wavefronts duplicated by the holographic optical element;
       performing a second propagation simulation until a virtual image is reconstructed, based on the plurality of complex wavefronts on which the first propagation simulation is performed;
       determining a loss value between the reconstructed virtual image and a target image;
       based on the loss value being greater than a predetermined threshold value, updating a current phase profile; and
       based on the loss value being less than or equal to the predetermined threshold value, ending the update.

17. The phase profile optimization method of claim 16, wherein the performing the first propagation simulation comprises determining a coherent sum of the plurality of complex wavefronts.

18. The phase profile optimization method of claim 16, wherein the determining the loss value comprises determining the loss value based on a loss function represented as:

$$F_{loss} = L2\mathrm{Norm}[s \times |v(x_t, y_t)| - A_{target}(x_t, y_t)]$$

where s is a scale factor, $v(x_t, y_t)$ is a signal value of an $(x_t, y_t)$ coordinate of the virtual image, and $A_{target}(x_t, y_t)$ is a signal value of an $(x_t, y_t)$ coordinate of the target image.

19. The phase profile optimization method of claim 18, wherein the signal value of the $(x_t, y_t)$ coordinate of the virtual image is determined based on phase profile information and a propagation function modeled based on a propagation distance between the eye-box and the virtual image.

20. The phase profile optimization method of claim 16, wherein the updating the current phase profile comprises updating the current phase profile such that the loss value is decreased by the updated phase profile.

21. A non-transitory computer-readable storage medium storing instructions that, when executed by at least one processor, cause the at least one processor to:
- input an arbitrary phase profile to a spatial light modulator;
- perform a first propagation simulation on a plurality of complex wavefronts duplicated by a holographic optical element;
- perform a second propagation simulation until a virtual image is reconstructed, based on the plurality of complex wavefronts on which the first propagation simulation is performed;
- determine a loss value between the reconstructed virtual image and a target image;
- based on the loss value being greater than a predetermined threshold value, update a current phase profile; and
- based on the loss value being less than or equal to the predetermined threshold value, end the update.

\* \* \* \* \*